Patented Feb. 16, 1943

2,311,587

UNITED STATES PATENT OFFICE 2,311,587

PLASTICIZED POLYAMIDE

Gordon T. Vaala, Wilmington, Del., assignor to E. I. du Pont de Nemours & Company, Wilmington, Del., a corporation of Delaware No Drawing. Application May 27, 1940,
Serial No. 337,547

3 Claims. (Cl. 260—33)

This invention relates to synthetic linear superpolyamides—hereinafter sometimes referred to merely as polyamides—and more particularly to the plasticization thereof.

The various plasticizers now known for the polyamides have, in common, the property of improving, to varying degrees, the pliability and workability of the polyamides. In most cases, however, this improvement is accompanied by a marked reduction in tensile strength. Furthermore, as a general rule, highly plasticized polyamides are given to cracking when subjected to steam treatments, such as that conventionally employed in the lasting of shoes. In addition, many of the plasticizers for the polyamides are sensitive to moisture, and tend to be leached out on exposure to conditions of high humidity, or to free water. A still further disadvantage, encountered in the attempted use of certain compounds which are known to exert a plasticizing effect on various materials is that, due to volatility, the said compounds tend to evaporate from the composition merely on standing.

This invention has as an object the production of plasticized synthetic linear superpolyamide compositions in which the foregoing disadvantages are obviated or minimized.

This object, as well as others which will become apparent from the following description, are accomplished by incorporating in the polyamide, or in a composition comprising the same, an alicyclic alcohol which boils above 200° C.

A new class of fiber-forming polymers known as synthetic linear superpolyamides is described in U. S. 2,071,250, 2,071,253 and 2,130,948. A generally characteristic property of these polymers is their capacity for being spun into filaments which can be cold drawn into fibers showing molecular orientation along the fiber axis. These polyamides are especially useful for the preparation of fibers, bristles, ribbons, sheets, rods, tubes, and the like. They are of two general types—those derived from monoaminomonocarboxylic acids and their amide-forming derivatives, and those derived from the reaction of suitable diamines with suitable dicarboxylic acids or amide-forming derivatives of dibasic carboxylic acids. It will be noted that the polyamides are derived from bifunctional amide-forming derivatives. On hydrolysis with mineral acids, the polyamides revert to bifunctional amide-forming reactants. For example, a polyamide derived from a diamine and a dibasic acid yields on hydrolysis with hydrochloric acid the dibasic acid and the diamine hydrochloride. Similarly, a polyamide derived from an amino acid yields a monoaminomonocarboxylic acid hydrochloride on hydrolysis with hydrochloric acid.

The synthetic linear polyamides can be formed into many useful objects, without the use of solvents or plasticizers, merely by spinning, extruding, or otherwise forming the object from the molten polyamide. To improve the properties of the objects thus formed it generally is desirable to subject them to a process of cold drawing (application of tensile stress) or to a process of cold working, for example, cold rolling (application of compressive force), or to subject them to both cold drawing and cold working. The products thus formed are strong, generally have high-melting points, and for many purposes they possess adequate pliability. For certain uses, however, and particularly for use in the form of films, sheets, and the like, greater pliability is often desired. For instance, in the coating of fabrics, for which purpose the unusual toughness of the polyamides makes them particularly appropriate, a high degree of pliability and workability is especially necessary. While a number of modifying agents are known to be effective to improve the pliability of the polyamides under ordinary conditions, most of the plasticizers heretofore employed cause the polyamide coating compositions to crack and become weak, when subjected to steam treatments such as mentioned hereinabove.

It has now been found that high boiling alicyclic alcohols, such as abietyl alcohol, dihydroabietyl alcohol, and amylcyclohexanol, are compatible with synthetic linear polyamides over a wide range, and yield, in admixture with them, products possessing good toughness and pliability. These alcohols impart an improved drape to polyamide films and polyamide coated fabrics and also increase markedly the resistance of the polyamides to cracking when subjected to steam treatment. Moreover, these alcohols generally are essentially nonvolatile and water-insoluble. In addition, they blend readily, as a rule, with conventional-type plasticizers, thereby permitting the preparation of a wide variety of compositions, having a wide range of properties.

Alicyclic alcohols, as a class, are high boiling, noncorrosive, and substantially inactive liquids. In the practice of this invention, I prefer to use alicyclic alcohols boiling above 200° C.—and in the usual case boiling above 275° C.—containing at least one hydroxyl group connected to the alicyclic ring either directly or through a single carbon atom. Such alicyclic alcohols contain at least 8 carbon atoms. For most purposes, quantities of the alicyclic alcohol ranging from 5 to 150%—preferably from 20 to 80% by weight of the polyamide—are employed to greatest advantage, but the exact amount to be used will depend upon the nature of the alicyclic alcohol, the polyamide, and the properties desired in the final product. It is to be noted that the addition of even fairly large quantities of the alicyclic alcohol does not lower the melting point of the product excessively, and that therefore the aforesaid alicyclic alcohols are particularly useful as modifying agents for the polyamides, where high melting pliable compositions are needed.

A very convenient method for incorporating the alicyclic alcohol in the polyamide consists in dissolving the alicyclic alcohol and the polyamide in a mutual solvent. Such solutions can be used in making filaments, films, rods, and the like, by evaporative or coagulative methods. The lower fatty acids, e. g., formic acid, are useful solvents for this purpose. Phenol also can be used to advantage. Mixtures of chloroform and methanol, or ethanol and water, are especially useful solvents for polyamide interpolymers.

Another convenient method for incorporating the alicylic alcohol in the polyamide consists in immersing the polyamide in sheet form in a solution of the alicyclic alcohol in a non-solvent for the polyamide. Concentrated or saturated solutions of the alicyclic alcohol in aqueous ethanol are especially useful for this purpose. Under these conditions the alicyclic alcohol is absorbed by the polyamide sheets. After the desired amount has been absorbed the film is removed and dried. The plasticizing effect of the alicyclic alcohol is enhanced by the presence within the polyamide sheet of a small amount of water. The amount of water which the polyamide sheet absorbs from the air under ordinary conditions of humidity usually is sufficient for this purpose.

The alicyclic alcohols of this invention also may be incorporated into the polyamides by direct blending while the latter are in the molten state.

The invention is described more specifically in the following examples in which parts are by weight.

*Example I*

An interpolyamide is prepared by heating equimolecular amounts of hexamethylene diammonium adipate and decamethylene diammonium sebacate at 230–260° C. under conditions which permit removal of the water formed during the reaction. The polymer thus prepared has an intrinsic viscosity of 1.0. Ten parts of this polymer and ten parts of abietyl alcohol are dissolved in 35 parts of n-butyl alcohol by heating in an oil bath for four hours at reflux temperature. The solution is cast, while still hot, on a glass plate previously heated to 100° C. The solvent is removed by baking an an oven at 100° C. for two hours. After allowing the film to cool it is removed by immersion in water for several hours. A clear, tough, pliable film melting at 145° C. is obtained.

*Example II*

Two parts of polyhexamethylene adipamide (intrinsic viscosity=0.85), in the form of a ribbon, is dried at 100° C. for 24 hours and allowed to cool in a desiccator. The ribbon is weighed, and then immersed for 24 hours in a solution consisting of 10 parts of tertiary amylcyclohexanol in 90 parts of ethyl alcohol. The ribbon next is rinsed in ethyl alcohol, wiped dry, stored at 25° C. and 15% R. H. (relative humidity) for 72 hours, and reweighed. The strip shows a 3.84% increase in weight.

*Example III*

An interpolyamide is prepared from 6000 parts of hexamethylene diammonium adipate and 4000 parts of epsilon-aminocapronitrile. This interpolyamide has a melt viscosity of 1419 poises at 250° C. and melts at 170–175° C.

Fifteen parts of the interpolyamide in flake form are dissolved in 110 parts of a mixture of equal volumes of chloroform and methanol, by stirring at 60° C. for two hours. Sufficient coats of this solution are applied (drying after each coat) on sateen cloth (1.32–53″) to obtain a coating weight of 9.3 ounces per 50″ yard and an overall thickness of 0.023 to 0.024″. Next, a similar solution is prepared, except that in conjunction with the fifteen parts of interpolymer there is employed 10 parts of dihydroabietyl alcohol; and a substantially identical thickness of coating is applied to another sample of the said sateen cloth. Tested on the Schiltknecht flex machine (described in Automotive Industries 49, 1262–6), the second sample withstood over 50 per cent more flexes, before failing, than the first sample.

*Example IV*

Eighty parts of the interpolymer described in Example I, 31.5 parts of dihydroabietyl alcohol and 31.5 parts of a mixture of o- and p-N-ethyl toluene sulfonamide are dissolved in a mixture of 240 parts of chloroform and 120 parts of methanol by stirring at 60° C. for two hours. The solution is cooled to 20° C. and a portion poured onto a polished metal plate at the same temperature. By means of a leveling blade the solution is spread to an even layer and the solvent allowed to evaporate. The final traces of solvent are removed from the film by warming the plate at 60° C. for two hours. After standing at room temperature for several hours, the film is stripped from the metal plate. The film is firm and clear and has good body, such as is required for transparent wrapping foil. Films thus cast (approximately 0.001″ thick) are subjected to a durability test which is carried out in the following manner: Standard size bags are fabricated from the plasticized polyamide films and each bag filled with a fixed weight of beans. The bags are enclosed in chambers maintained at 35% relative humidity and 75° F. and the bags caused to fall from a fixed height, the number of falls without breaking being noted. Under these conditions, the bags prepared from films containing the dihydroabietyl alcohol and N-ethyl toluene sulfonamide withstand 1012 falls as compared to 16 falls for bags fabricated from similar polyamide sheeting containing no plasticizer.

*Example V*

An interpolyamide prepared from 450 parts of hexamethylene diammonium adipate and 300 parts of caprolactam is extruded from melt in ribbon form. This interpolymer has an intrinsic viscosity of 1.05, and melts at 174–177° C.

Ten parts of the ribbon is dissolved in a mixture of 20 parts of chloroform and 20 parts of methanol, by stirring at 60° C. for two hours. To this solution is added 5 parts of dihydroabietyl alcohol and 5 parts of dicresyl Carbitol. Stirring is continued for one-half hour, and the solution then is cooled to room temperature, and a portion poured onto a glass plate. By means of a leveling blade the solution is spread to an even layer and the solvent allowed to evaporate at room temperature. Final traces of solvent are removed from the film by heating at 65° C. for 15 hours. The film melts at 175° C. when tested on a copper block in the open air, and is exceptionally strong considering the large amount of plasticizer used. It exhibits a tensile value of 6500 lbs./sq. in., based on the original dimensions of the film, and an elongation of over 300%. The film is clear and dry, and shows no exudation on cold drawing.

*Example VI*

Fifteen parts of the interpolymer described in Example V is dissolved in a mixture of 46 parts of chloroform and 23 parts of methanol. Three parts of dihydroabietyl alcohol, 3 parts of dicresyl Carbitol, and 9 parts of 1,12-diphenyloloctadecane are added to the dissolved polymer, with stirring. The solution is cooled to room temperature and a film cast as described in Example V. The resulting film melts at 164° C., when tested on a copper block in the open air. The film is clear and has exceptionally good pliability and drape.

*Example VII*

An interpolyamide having an intrinsic viscosity of 0.81 and a melting point of 173° C. is prepared from 262 parts of hexamethylene diammonium adipate and 262 parts of 12-aminostearic acid. One hundred parts of the polymer, 8.6 parts of dihydroabietyl alcohol, 25.8 parts of the condensation product of phenol with 1,12-octadecanediol, and 8.6 parts of dicresyl Carbitol are dissolved in 400 parts of a mixture of equal volumes of chloroform and methanol, by stirring at 50° C. for two hours. The solution is cooled to room temperature, and a film cast as described in Example V. The film is removed from the glass plate, and final traces of solvent eliminated by aging at 65° C. for 15 hours. The film thus prepared melts at 163° C., has an elongation of 286%, and a tensile value of 2390 lbs./sq. in., based on the original dimensions.

*Example VIII*

Five thousand one hundred ten parts of the interpolyamide described in Example III, 795 parts of dihydroabietyl alcohol, and 560 parts of amylbenzenesulfonamide are dissolved in a mixture of 777 parts of water, 1010 parts of acetone, and 9660 parts of ethyl alcohol, by warming and stirring for seven hours at 70–75° C. A mixture of 1820 parts of amylbenzenesulfonamide, 795 parts of dicresyl Carbitol, and 2270 parts of bone black is added to the solution, and heating and stirring are continued for 16 hours. The resultant composition will be designated as composition A.

A second solution is prepared by dissolving 1700 parts of the same interpolyamide, and 1700 parts of amylbenzenesulfonamide in a solvent mixture consisting of 2860 parts of ethyl alcohol, 300 parts of acetone, and 251 parts of water. The resultant composition will be designated as composition B.

An anchor coat is applied by spreading two coats of composition B over black sateen fabric, each of the same being followed by drying at 190° F. Next, six coats of composition A are applied over the anchor coat. Each coat is dried at 190° F. before the addition of the next one. The coated fabric is skivered by embossing with a box calf plate at 180° F. Eight additional coats of composition A now are spread over the coated fabric in a similar manner. The finished product has good pliability, is dry to the touch, and has an especially attractive surface; which surface closely resembles that of finished leather. This material flexes 120,000 times on the hereinabove identified Schiltknecht flex machine before failing, and gives a scrub value of 3022 (scrub test described in Automotive Industries, 49, 1262–6). A sample of the coated fabric fastened under slight tension over the beveled edge of a piece of wood, does not crack when subjected to the direct action of steam.

It is to be understood that the aforementioned examples are merely illustrative of the compositions of this invention and their manner of preparation.

Instead of the polyamides mentioned above which are obtainable from bifunctional polyamide-forming reactants as essentially sole reactants, I may use the linear superpolymers obtained by including with the polyamide-forming reactants used to prepare the polyamides other bifunctional reactants. such as amino alcohols and hydroxy acids. As examples of such modified polyamides may be mentioned those derived from diamines, dibasic acids, and amino alcohols; those derived from amino acids, dibasic acids, and amino alcohols; and those derived from amino acids and hydroxy acids. Although these products contain ester linkages, they still may be referred to as polyamides, since they contain a plurality of amide linkages and retain many of the desirable properties of the simple polyamides. Like the simple polyamides, these modified polyamides generally do not exhibit fiber-forming properties unless their intrinsic viscosity is at least 0.4.

As additional examples of alicyclic alcohols which may be used in making the compositions of this invention may be mentioned tetrahydroabietyl alcohol, octyl-cyclohexanol, diamyl-cyclohexanol, hexyl-cyclohexanol, dihexyl-cyclohexanol, cyclohexyl-cyclohexanol, 2-cyclohexyl-4-tertiary butyl-cyclohexanol, phenyl-cyclohexanol, 1,2,3,4-tetrahydro-1-naphthol, decahydronaphthol, amyl-decahydronaphthol, octyl-decahydronaphthol, diamyl-decahydronaphthol, phenyl cyclohexyl carbinol, and dicyclohexyl carbinol. Other examples include 3-(4-hydroxy-cyclohexyl)-propanol-1 and 4-n-propylcyclohexanediol-1,2 (hydrogenation products from lignin), 2,2-bis-(4-hydroxycyclohexyl) propane, borneol, the terpineols, menthol, 1,4-terpin, 1,8-terpin, carvomenthol, quinitol, cyclohexane-1,3,5-triol, diamylcyclopentanol and long chain cyclopentane carbinols obtained by the hydrogenation of naphthenic acid esters.

As already indicated, the plasticizing effect of the alicyclic alcohol is enhanced by the presence of a small amount of water. Other nonsolvents containing alcoholic hydroxyl groups, particularly alcohols such as methanol, propanol, isobutanol, benzyl alcohol, cyclohexanol, hexamethylene glycol, and glycerol have a similar effect. Moreover, there may be associated with the polyamide alicyclic alcohol composition other types of plasticizers, such as dibutyl phthalate, methyl Cellosolve phthalate, benzyl Cellosolve, tricresyl phosphate, monomeric amides boiling over 220° C., cyclic ketones in which a carboxyl group forms a part of the ring structure, phenols, and sulfonamides, especially alkylaryl sulfonamides in which the alkyl group contains at least four carbon atoms. Especially valuable products are obtained by using the plasticizers of this invention in conjunction with amylbenzenesulfonamide, butyl phthalyl butyl glycolate, dicresyl Carbitol, and 1,12-diphenyloloctadecane. Valuable compositions also are obtained by using certain three-component blends containing dihydroabietyl alcohol; e. g., dicresyl Carbitol, dihydroabietyl alcohol, and diphenyloloctadecane; butyl phthalyl butyl glycolate, amylbenzenesulfonamide, and dihydroabietyl alcohol; and diamylbenzenesulfonamide, butyl phthalyl butyl glycolate, and dihydroabietyl alcohol. The compositions of the invention also may contain other types of modifying agents, such as luster-modifying agents, pigments, dyes, antioxidants, oils, antiseptics, and cellulose derivatives.

The polyamide alicyclic alcohol compositions are useful in many forms and for many purposes. Typical applications are yarns, fabrics, bristles, surgical sutures, fishing leaders, fishlines, dental floss, rods, tubes, films, photographic film bases, ribbons, sheets, safety glass interlayers, molded articles, adhesives, electrical insulation (e. g. for wire), impregnating agents, and coating compositions. The compositions are particularly useful in coating fabrics to be used as substitutes for leather, as well as for impregnating cloth which is to be calendered or pressed for use as collar interliners. An advantage which these plasticized polyamides have over unmodified polyamides is that they are more pliable at low temperatures. This advantage is most important in connection with the use of the product in sheet form. Typical uses for the materials in this form are wrapping foils, raincoats, shower curtains, and umbrellas.

By reason of the fact that the superpolyamide-alicyclic alcohol compositions may be melted and then melt-extruded, they can readily be formed into tubing or coated directly onto fabrics and metals. The compositions are useful, furthermore, in the preparation of blown articles, such as toys and hollow toiletware. In addition, they may be compression molded, for example, blanked, or stamped out in shaped articles.

As many apparently widely different embodiments of this invention may be made without departing from the spirit and scope thereof, it is to be understood that I do not limit myself to the specific embodiment thereof except as defined in the appended claims.

I claim:

1. A composition of matter comprising a synthetic linear polyamide of intrinsic viscosity at least 0.4, plasticized with hydroabietyl alcohol, said polyamide being the reaction product of a polymer-forming composition which comprises reacting material selected from at least one of the groups consisting of (a) monoaminomonocarboxylic acids, and (b) mixtures of diamine with dibasic carboxylic acid.

2. The composition of matter set forth in claim 1 in which the polyamide is an interpolyamide derived from at least three polyamide-forming reactants.

3. The composition of matter set forth in claim 1 in which said polyamide is derived from hexamethylenediamonnium adipate and caprolactam.

GORDON T. VAALA.